United States Patent
Thompson

(10) Patent No.: US 7,137,240 B2
(45) Date of Patent: Nov. 21, 2006

(54) INLET MUFF ANTI-ICING SYSTEM FOR AN AUXILIARY POWER UNIT

(75) Inventor: Robert G. Thompson, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 168 days.

(21) Appl. No.: 10/920,962

(22) Filed: Aug. 18, 2004

(65) Prior Publication Data

US 2006/0037303 A1    Feb. 23, 2006

(51) Int. Cl.
*F02G 3/00* (2006.01)

(52) U.S. Cl. .................... 60/39.093; 60/782

(58) Field of Classification Search ............. 60/39.093, 60/782
See application file for complete search history.

(56) References Cited

U.S. PATENT DOCUMENTS

| | | | | |
|---|---|---|---|---|
| 4,782,658 A | * | 11/1988 | Perry | 60/226.1 |
| 4,831,819 A | * | 5/1989 | Norris et al. | 60/39.093 |
| 5,011,098 A | * | 4/1991 | McLaren et al. | 244/134 B |
| 5,088,277 A | * | 2/1992 | Schulze | 60/39.093 |
| 5,220,785 A | * | 6/1993 | Miller | 60/39.093 |
| 5,257,498 A | * | 11/1993 | Nikkanen et al. | 60/39.093 |
| 5,400,984 A | * | 3/1995 | Arnold et al. | 244/134 B |
| 5,623,821 A | * | 4/1997 | Bouiller et al. | 60/39.093 |
| 5,755,404 A | * | 5/1998 | Numbers | 244/134 C |
| 5,930,990 A | * | 8/1999 | Zachary et al. | 60/39.53 |
| 5,944,287 A | * | 8/1999 | Rodgers | 244/134 R |
| 6,079,670 A | * | 6/2000 | Porte | 244/134 B |
| 6,264,137 B1 | * | 7/2001 | Sheoran | 244/53 B |
| 6,354,538 B1 | * | 3/2002 | Chilukuri | 244/134 B |
| 6,371,411 B1 | * | 4/2002 | Breer et al. | 244/134 R |
| 6,427,434 B1 | * | 8/2002 | Porte et al. | 60/39.093 |
| 6,442,944 B1 | * | 9/2002 | Skur, III | 60/782 |
| 6,457,676 B1 | * | 10/2002 | Breer et al. | 244/134 R |
| 6,688,558 B1 | * | 2/2004 | Breer et al. | 244/134 R |
| 6,702,233 B1 | * | 3/2004 | DuPont | 244/134 B |
| 6,848,656 B1 | * | 2/2005 | Linton | 244/134 C |

* cited by examiner

*Primary Examiner*—William H. Rodriguez
(74) *Attorney, Agent, or Firm*—Stephen G. Mican

(57) ABSTRACT

An auxiliary power unit (APU) inlet muff anti-icing system that uses high pressure, high temperature APU compressor delivery air to melt any accumulation of ice and snow near the bottom of the muff with a tracer line coupled to a perforated gull wing fairing mounted within the inlet muff and that uses the compressor delivery air as the primary stream for an ejector to suck ice and snow melt accumulating near the fairing overboard.

25 Claims, 3 Drawing Sheets

INLET MUFF ANTI-ICING SYSTEM FOR AN AUXILIARY POWER UNIT

FIELD OF THE INVENTION

The invention relates to inlet air ductwork for an aeronautical auxiliary power unit (APU), and more particularly to anti-icing systems for APU inlet air ductwork.

BACKGROUND OF THE INVENTION

The inlet ductwork leading from the surface of an aircraft to the inlet of an aeronautical auxiliary power unit (APU) is subject to accumulating snow and ice under winter conditions. The snow and ice tend to gather within the vicinity of the APU "inlet muff". The inlet muff is a duct that is shaped to receive air from an inlet duct that typically has a rectangular cross-section. The muff receives and distributes ambient air from the inlet duct around the periphery of the inlet to the APU. The APU inlet is commonly defined by a ring shaped perforated cylinder that passes the air whilst providing APU structure protection from objects being drawn into the engine. The muff itself has an open side, typically located above the APU engine centreline. The flow into the muff is generally in the downward direction.

Some quantity of ice and snow tends to accumulate on the APU inlet protection screen near the muff inlet, but a greater quantity tends to accumulate on the side opposite the muff inlet, near the bottom of the muff. The bottom of the muff usually has a "gull-wing" fairing that avoids stagnating the airflow and inhibits the inlet air from oscillating from side to side within the muff.

The greater quantity of ice and snow that accumulates near the bottom of the muff is difficult to remove. Accumulation of ice and snow in this location can build up to the point that it obstructs air from entering the APU. This condition leads to inlet pressure loss that can build up to the point of compromising the APU power capability.

SUMMARY OF THE INVENTION

The invention comprises an auxiliary power unit (APU) inlet muff anti-icing system that uses high pressure, high temperature APU compressor delivery air to melt any accumulation of ice and snow near the bottom of the muff with a tracer line coupled to a perforated gull wing fairing mounted within the inlet muff and that uses the compressor delivery air as the primary stream for an ejector to suck ice and snow melt accumulating near the fairing overboard.

In a preferred embodiment, the invention comprises a system for removing accumulations of ice and snow from the bottom of inlet muff of an auxiliary power unit (APU), comprising: a gull wing fairing mounted within the inlet muff to direct inlet air into an inlet of the APU that has a plurality of perforations to allow air and liquid flow through the fairing into a stagnant air region of the inlet muff below the fairing; a tracer line comprising tubing that is arranged along a surface of the fairing in a general "zigzag" pattern that has an inlet coupled to a primary stream of high pressure hot air and an outlet to warm the fairing sufficiently to melt ice and snow that accumulates in the region of the fairing; and an ejector with a primary nozzle inlet coupled to the outlet of the tracer line for coupling the primary stream of high pressure hot air into an ejector nozzle and a secondary stream inlet that couples the stagnant air region of the inlet muff below the fairing to an ejector mixing tube to suck a secondary stream of air with ice and snow melt from the bottom of the inlet muff and discharge it from an outlet of the ejector mixing tube.

DETAILED DESCRIPTION OF THE INVENTION

Figure 1:
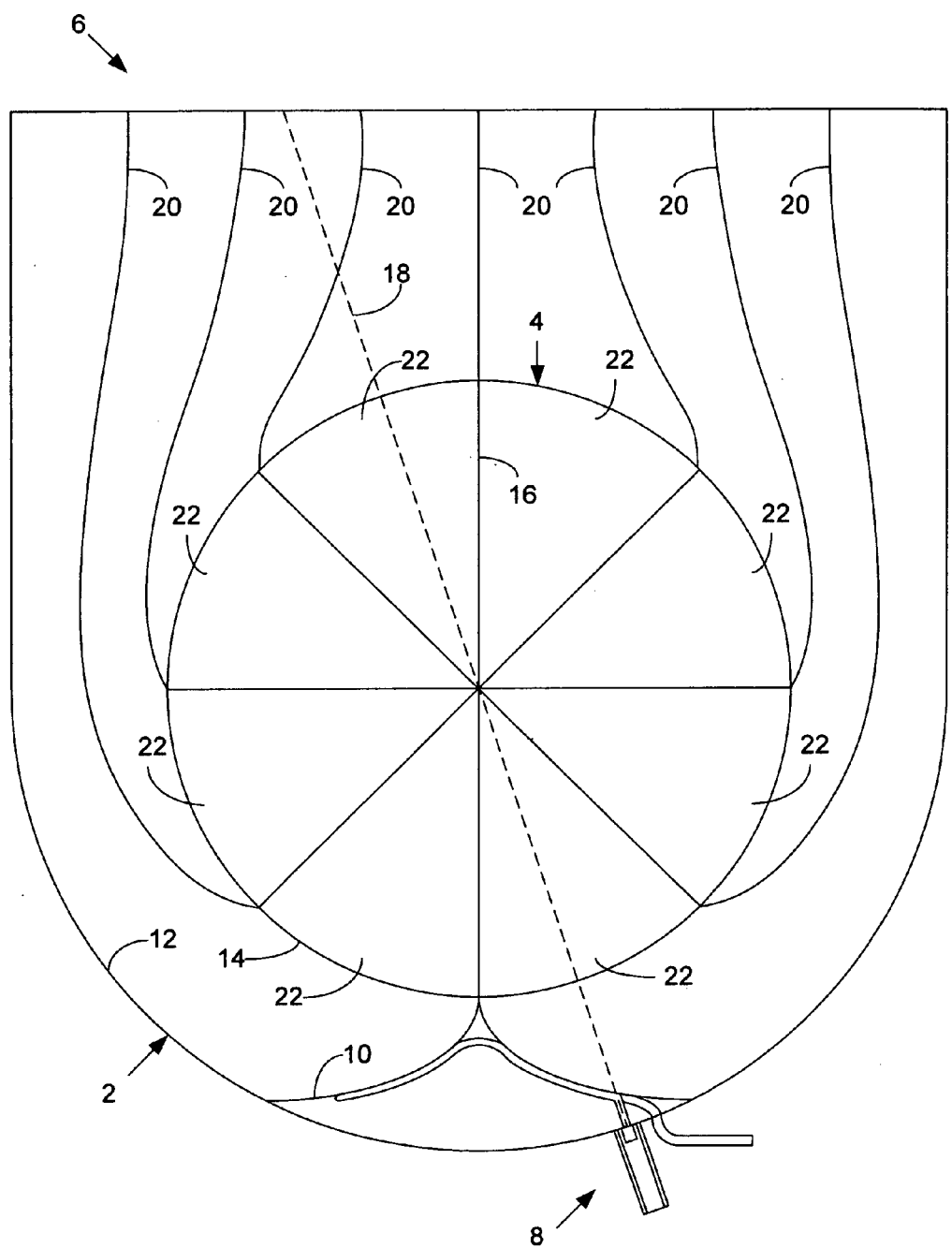
FIG. 1 is a cut-away end view of an inlet muff around an inlet of an APU and connections of the muff to a muff anti-icing system according to a preferred embodiment of the invention.

FIG. 1 is a cut-away end view of an inlet muff 2 around an APU inlet 4 of an APU 6 and connections of the muff 2 to a muff anti-icing system 8 according to a preferred embodiment of the invention. A "gull wing" fairing 10 is placed along the bottom of the muff 2, between an inner surface 12 of the muff 2 and an outer surface 14 of the APU inlet 4 along an axis 16 that is generally at an angle from vertical, represented by an axis 18. This angle is generally in the range of about 15 to 20 degrees to provide for the physical constraint of avoiding interference with the tail section of the aircraft. Airflow for ambient air sucked into the APU inlet 4 through the muff 2 is represented by streamlines 20. Each of the streamlines 20 represents air inlet mass flow from each side of the on-axis streamline 20 of ⅛, ¼, ⅜ and ½ of the total air mass flow. These respective airflows impinge upon respective octants 22 of the APU inlet 4.

Figure 2:
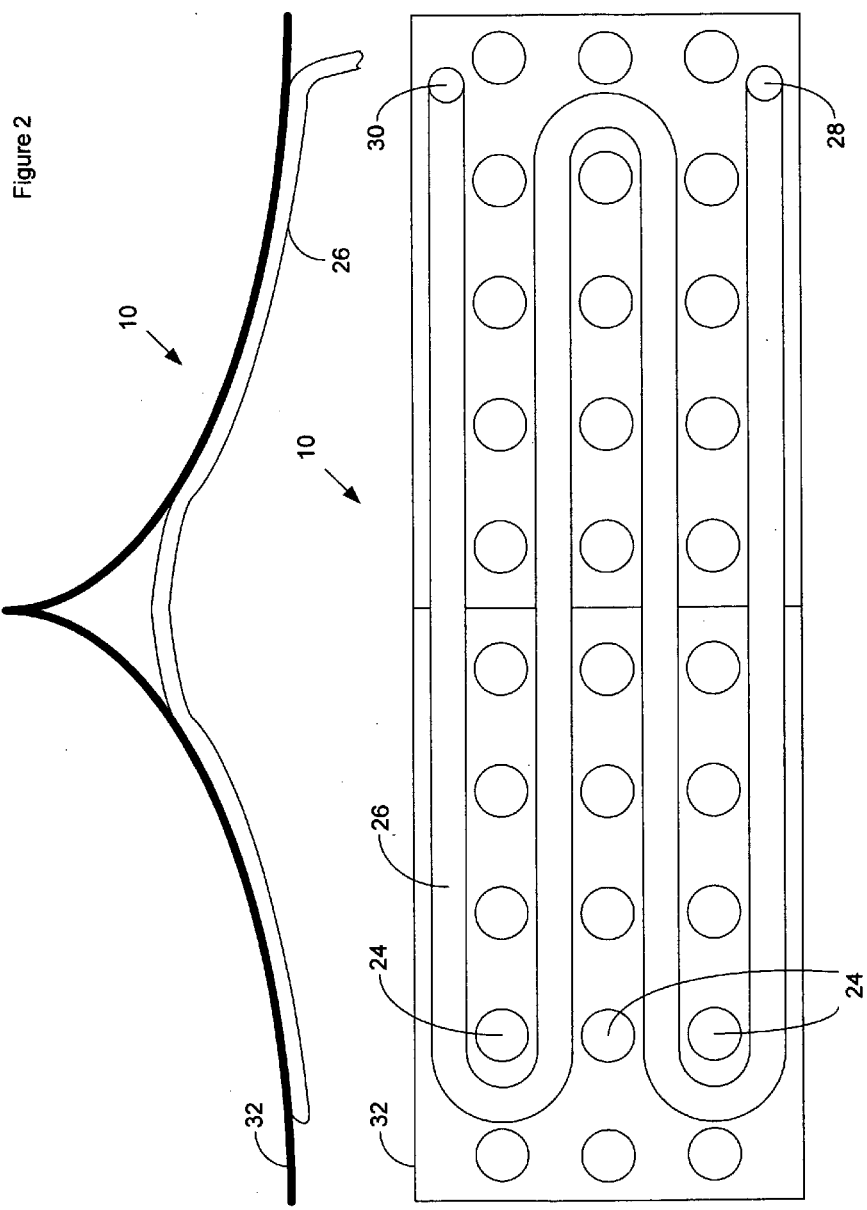
FIG. 2 is a detailed side and bottom view of a gull wing fairing according to a preferred embodiment of the invention.

FIG. 2 is a detailed side and bottom view of the gull wing fairing 10 according to a preferred embodiment of the invention. The fairing 10 has a series of perforations 24 to allow flow of ice and snow melt, as well as inlet air, into a "dead zone" or stagnant air region within the inlet muff 2 beneath the fairing 10. The fairing 10 also has a "tracer" line 26 with an inlet 28 and an outlet 30 that comprises tubing that "zigzags" along a surface 32 of the fairing. Although the surface 32 is shown as along the bottom of the fairing 10 in FIG. 2, the surface 32 can also be selected as along the top of the fairing 10.

Figure 3:
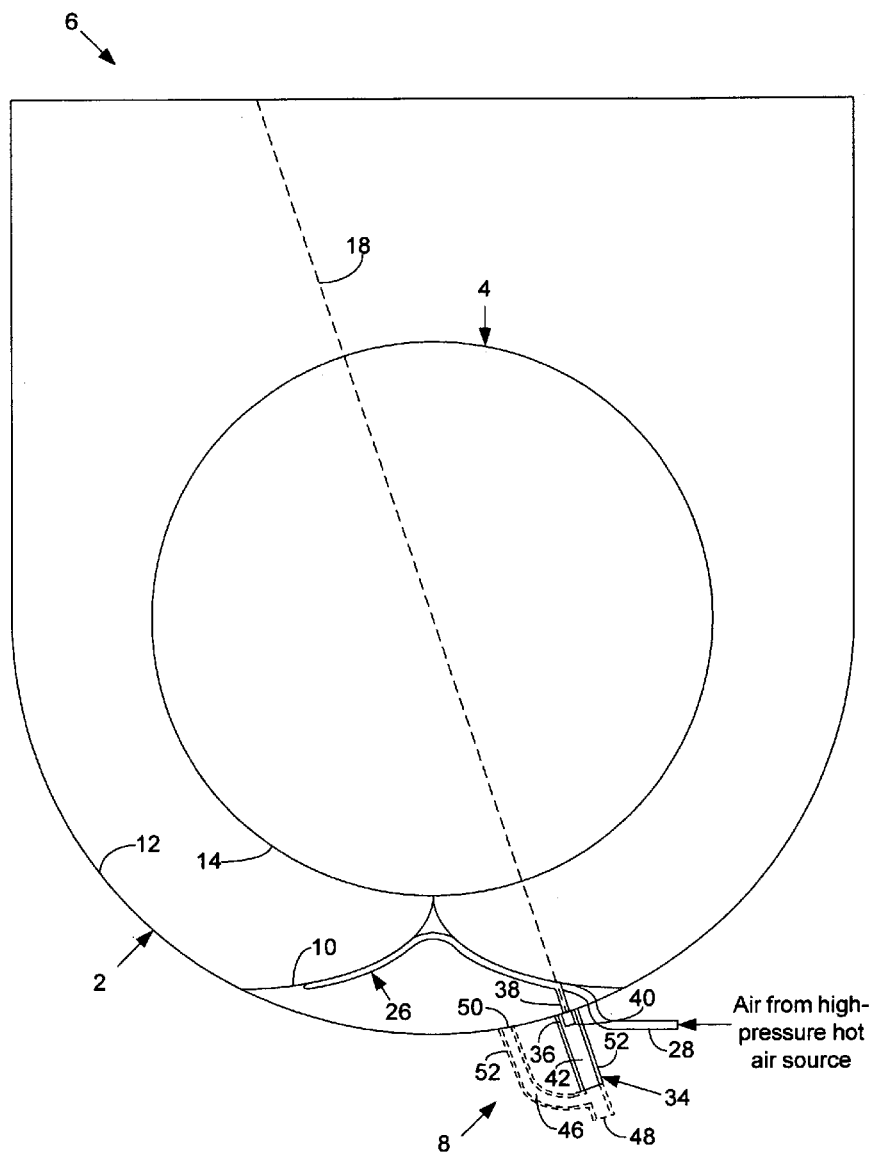
FIG. 3 is a detailed side view of a preferred embodiment of the invention.

FIG. 3 is a detailed side view of a preferred embodiment the muff anti-icing system 8 according to the invention. The anti-icing system 8 has an ejector, or jet pump, section 34, with a secondary stream inlet section 36 for the ejector section 34 coupled to the bottom of the muff 2 in the general region of bottom dead centre of the muff 2, below the fairing 10. The ejector 34 is a conventional ejector, eductor or jet pump, as known in the art. The ejector 34 includes a primary stream inlet section 38 that couples a primary stream nozzle 40 within the ejector 34 to the outlet 30 of the tracer line 26. The inlet 28 of the tracer line 26 couples to a source of high-pressure hot air, typically APU compressor delivery air provided by a load compressor (not shown) for the APU 6 or bleed air from a cycle compressor (not shown) in a power head of the APU 6. In this case, the APU compressor delivery air serves as the primary stream for the ejector 34.

As known in the art, an ejector is a suction pump in which fluid under high pressure is forced through a nozzle into an abruptly larger tube where a high velocity jet, at a low pressure in accordance with Bernoulli's law, entrains gas or liquid from a side tube opening just beyond the end of the nozzle to create suction. In this case, the high pressure hot air that passes through the nozzle 40 creates a high velocity, low pressure jet of air in an ejector mixing tube section 42 of the ejector 34 that is coupled to the secondary stream inlet section 36 to suck a secondary stream of air and fluids, including ice and snow melt, from the muff 2 in the region of the gull wing fairing 10.

Passage of the hot air from the load compressor through the tracer line 26 serves to melt any ice and snow that accumulates in the vicinity of the fairing 10. The positioning of the coupling of the secondary stream inlet section 36 to the underside of the muff 2 uses gravity to enhance the suction of ice and snow melt from the muff 2.

The ejector mixing tube section 42 has an outlet 44 that may discharge overboard, or it may couple to a manifold 46 with a lower outlet 48 for discharging ice and snow melt overboard and an upper outlet 50 that directs at least a portion of the primary and secondary air streams back into the muff 2, preferably into a stagnant air region of the muff 2 below the gull wing fairing 10 as shown in FIG. 2. In this case, the discharge from the upper outlet 50 of hot air assists the tracer line 26 to melt any accumulation of ice and snow within the muff 2 that accumulates in the region of the gull wing fairing 10. The secondary stream inlet section 36 then sucks away any such melt as described above. As indicated above, the lower outlet 48 allows drainage of liquids, such as ice and snow melt, so that such liquids are not re-introduced into the muff 2 by the discharge of the primary and secondary streams through the upper outlet 50.

In addition, the coupling from the inlet 28 of the tracer line 26 to the compressor delivery air may be regulated with appropriate valving, orifice or flow restrictor to suit environmental conditions, as shall be appreciated by those skilled in the art. Furthermore, if the manifold 46 is used, the discharge of the upper outlet 50 back into the muff 2 may also be regulated with appropriate valving, orifice or flow restrictor to suit environmental conditions.

As shown in FIG. 3, the primary stream inlet section 38 and the primary stream nozzle 40 are mounted within the muff 2 at the entrance of the secondary stream inlet section 36 to minimise external surfaces that might promote refreezing of ice and snow melt. Furthermore, insulation 52 is preferably applied to the external surfaces of the ejector 34 and the manifold 46, if used, to minimise the possibility of refreezing.

Described above is an auxiliary power unit (APU) inlet muff anti-icing system that uses high pressure, high temperature APU compressor delivery air to melt any accumulation of ice and snow near the bottom of the muff with a tracer line coupled to a perforated gull wing fairing mounted within the inlet muff and that uses the compressor delivery air as the primary stream for an ejector to suck ice and snow melt accumulating near the fairing overboard. It should be understood that this embodiment of the invention is only an illustrative implementation of the invention, that the various parts and arrangement thereof may be changed or substituted, and that the invention is only limited by the scope of the attached claims.

What is claimed is:

1. A system for removing accumulations of ice and snow from the bottom of inlet muff of an auxiliary power unit (APU), comprising:

a gull wing fairing mounted within the inlet muff to direct inlet air into an inlet of the APU that has a plurality of perforations to allow air and liquid flow through the fairing into a stagnant air region of the inlet muff below the fairing;

a tracer line comprising tubing that is arranged along a surface of the fairing in a general "zigzag" pattern that has an inlet coupled to a primary stream of high pressure hot air and an outlet to warm the fairing sufficiently to melt ice and snow that accumulates in the region of the fairing; and an ejector with a primary nozzle inlet coupled to the outlet of the tracer line for coupling the primary stream of high pressure hot air into an ejector nozzle and a secondary stream inlet that couples the stagnant air region of the inlet muff below the fairing to an ejector mixing tube to suck a secondary stream of air with ice and snow melt from the bottom of the inlet muff and discharge it from an outlet of the ejector mixing tube.

2. The system of claim 1, wherein the tracer line is mounted along a bottom surface of the fairing.

3. The system of claim 1, wherein the tracer line is mounted along a top surface of the fairing.

4. The system of claim 1, wherein the compressor delivery air is provided by an APU load compressor.

5. The system of claim 1, wherein the compressor delivery air is provided by bleed air from a cycle compressor in an APU power head.

6. The system of claim 1, wherein the primary nozzle inlet and the primary nozzle are positioned within the inlet muff.

7. The system of claim 1, further comprising insulation that covers surfaces of the ejector external to the inlet muff.

8. The system of claim 1, wherein the compressor delivery air supplied to the inlet of the tracer line is regulated with valving to suit environmental conditions.

9. The system of claim 1, wherein the compressor delivery air supplied to the inlet of the tracer line is regulated with an orifice to suit environmental conditions.

10. The system of claim 1, wherein the compressor delivery air supplied to the inlet of the tracer line is regulated with a flow restrictor to suit environmental conditions.

11. The system of claim 1, further comprising a manifold with an inlet coupled to the outlet of the ejector mixing tube, a lower outlet for discharging ice and snow melt from the bottom of the inlet muff, and an upper outlet coupled to the stagnant region of the inlet muff for discharging at least a portion of the primary and secondary air streams back into the muff to assist the tracer line to melt any accumulation of ice and snow within the muff that accumulates in the region of the fairing.

12. The system of claim 11, further comprising insulation that covers the manifold.

13. The system of claim 11, wherein the discharge from the upper outlet to the stagnant region of the inlet muff is regulated with valving to suit environmental conditions.

14. The system of claim 11, wherein the discharge from the upper outlet to the stagnant region of the inlet muff is regulated with an orifice to suit environmental conditions.

15. The system of claim 11, wherein the discharge from the upper outlet to the stagnant region of the inlet muff is regulated with a flow restrictor to suit environmental conditions.

16. A system for removing accumulations of ice and snow from the bottom of inlet muff of an auxiliary power unit (APU), comprising:

a gull wing fairing mounted within the inlet muff to direct inlet air into an inlet of the APU that has a plurality of perforations to allow air and liquid flow through the fairing into a stagnant air region of the inlet muff below the fairing;

a tracer line comprising tubing that is arranged along a bottom surface of the fairing in a general "zigzag" pattern that has an inlet coupled to a primary stream of high pressure hot air from an APU load compressor and an outlet to warm the fairing sufficiently to melt ice and snow that accumulates in the region of the fairing; and an ejector with a primary nozzle inlet coupled to the outlet of the tracer line for coupling the primary stream of high pressure hot air into an ejector nozzle, the primary nozzle inlet and the primary nozzle both positioned within the inlet muff, and a secondary stream inlet that couples the stagnant air region of the inlet muff below the fairing to an ejector mixing tube to suck a secondary stream of air with ice and snow melt from the bottom of the inlet muff and discharge it from an outlet of the ejector mixing tube.

17. The system of claim 16, further comprising insulation covering surfaces of the ejector external to the inlet muff.

18. The system of claim 16, wherein the compressor delivery air supplied to the inlet of the tracer line is regulated with valving to suit environmental conditions.

19. The system of claim 16, wherein the compressor delivery air supplied to the inlet of the tracer line is regulated with an orifice to suit environmental conditions.

20. The system of claim 16, wherein the compressor delivery air supplied to the inlet of the tracer line is regulated with a flow restrictor to suit environmental conditions.

21. The system of claim 16, further comprising a manifold with an inlet coupled to the outlet of the ejector mixing tube, a lower outlet for discharging ice and snow melt from the bottom of the inlet muff, and an upper outlet coupled to the stagnant region of the inlet muff for discharging at least a portion of the primary and secondary air streams back into the muff to assist the tracer line to melt any accumulation of ice and snow within the muff that accumulates in the region of the fairing.

22. The system of claim 21, further comprising insulation that covers the manifold.

23. The system of claim 21, wherein the discharge from the upper outlet to the stagnant region of the inlet muff is regulated with valving to suit environmental conditions.

24. The system of claim 21, wherein the discharge from the upper outlet to the stagnant region of the inlet muff is regulated with an orifice to suit environmental conditions.

25. The system of claim 21, wherein the discharge from the upper outlet to the stagnant region of the inlet muff is regulated with a flow restrictor to suit environmental conditions.

* * * * *